(12) United States Patent
Kirschen et al.

(10) Patent No.: US 12,191,666 B2
(45) Date of Patent: Jan. 7, 2025

(54) SYSTEMS AND METHODS FOR POWER SYSTEM STABILIZATION AND OSCILLATION DAMPING CONTROL

(71) Applicant: University of Washington, Seattle, WA (US)

(72) Inventors: Daniel S. Kirschen, Seattle, WA (US); Payman Arabshahi, Seattle, WA (US); Ryan Elliott, Seattle, WA (US)

(73) Assignee: University of Washington, Seattle, WA (US)

( * ) Notice: Subject to any disclaimer, the term of this patent is extended or adjusted under 35 U.S.C. 154(b) by 450 days.

(21) Appl. No.: 17/602,143

(22) PCT Filed: Apr. 17, 2020

(86) PCT No.: PCT/US2020/028679
§ 371 (c)(1),
(2) Date: Oct. 7, 2021

(87) PCT Pub. No.: WO2020/214913
PCT Pub. Date: Oct. 22, 2020

(65) Prior Publication Data
US 2022/0149628 A1 May 12, 2022

Related U.S. Application Data

(60) Provisional application No. 62/835,885, filed on Apr. 18, 2019.

(51) Int. Cl.
*H02J 3/24* (2006.01)
*G05B 13/04* (2006.01)

(52) U.S. Cl.
CPC ............ *H02J 3/241* (2020.01); *G05B 13/041* (2013.01); *H02J 3/242* (2020.01)

(58) Field of Classification Search
None
See application file for complete search history.

(56) References Cited

U.S. PATENT DOCUMENTS

| | | | | |
|---|---|---|---|---|
| 2009/0009129 | A1* | 1/2009 | Markunas | ................. H02P 9/10 318/702 |
| 2010/0109447 | A1* | 5/2010 | Achilles | .................. H02J 3/381 307/153 |

(Continued)

FOREIGN PATENT DOCUMENTS

| | | |
|---|---|---|
| CN | 102496944 A | 12/2011 |
| CN | 103728933 A | 11/2013 |

(Continued)

OTHER PUBLICATIONS

"IEEE Standard for Synchrophasor Data Transfer for Power Systems", IEEE Std C37.118.2, Dec. 28, 2011, pp. 1-53.

(Continued)

*Primary Examiner* — Jared Fureman
*Assistant Examiner* — Joel Barnett
(74) *Attorney, Agent, or Firm* — Stoel Rives LLP

(57) ABSTRACT

Embodiments of the present disclosure provide systems and methods directed to improved power system stabilization and oscillation damping control. In operation, a computing device may receive frequency data from a plurality of sensors distributed within a power system. The computing device may calculate an estimate of a speed of a center of inertia signal based at least on the frequency data. A controller may calculate a control error signal for the power system based at least on the estimated speed of the center of inertia signal. The controller may further calculate an auxiliary output signal based at least on the calculated control (Continued)

error. An actuator may utilize the auxiliary output signal to provide an output configured to improve the stability of the power system.

20 Claims, 5 Drawing Sheets

(56) References Cited

U.S. PATENT DOCUMENTS

| | | | | |
|---|---|---|---|---|
| 2013/0099582 | A1* | 4/2013 | Ray | H02J 3/241 307/102 |
| 2016/0241035 | A1 | 8/2016 | Shi et al. | |
| 2018/0323644 | A1 | 11/2018 | Jia et al. | |
| 2018/0329383 | A1* | 11/2018 | Lian | H02J 3/241 |
| 2019/0369147 | A1 | 12/2019 | Liu et al. | |

FOREIGN PATENT DOCUMENTS

| | | | |
|---|---|---|---|
| CN | 104979834 | A | 8/2015 |
| CN | 104953713 | A | 9/2015 |
| CN | 106249103 | A | 7/2016 |
| CN | 106786675 | A | 2/2017 |
| CN | 107508295 | A | 10/2017 |
| CN | 107966672 | A | 12/2017 |
| CN | 108365615 | A | 2/2018 |
| CN | 109245122 | A | 10/2018 |
| CN | 109861245 | A | 12/2018 |
| CN | 109709378 | A | 1/2019 |
| CN | 109861279 | A | 1/2019 |
| CN | 110034565 | A | 5/2019 |
| CN | 110429659 | | 8/2019 |
| CN | 110518632 | A | 8/2019 |
| CN | 110581568 | A | 8/2019 |
| CN | 110994692 | A | 11/2019 |
| CN | 110912192 | A | 12/2019 |
| CN | 111049159 | A | 12/2019 |
| CN | 111146809 | A | 1/2020 |
| CN | 111614117 | A | 3/2022 |
| CN | 111725815 | A | 6/2022 |
| CN | 110581544 | A | 7/2022 |
| MX | 2019002151 | A | 7/2019 |

OTHER PUBLICATIONS

"Western Electricity Coordinating Council Policy Statement on Power System Stabilizers", https://www.wecc.org/Reliability/WECC%20PSS%20Policy%20Statement.pdf, 2002, pp. 1.

Aboul-Ela, Magdy E., et al., "Damping Controller Design for Power System Oscillations Using Global Signals", IEEE Transactions on Power Systems, vol. 11, No. 2, May 1996, pp. 767-773.

Ademola-Idowu, Atinuke, et al., "Frequency Stability Using MPC-Based Inverter Power Control in Low-Inertia Power Systems", IEEE Transactions on Power Systems, vol. 36, No. 2, Mar. 2021, pp. 1628-1637.

Alhelou, Hassan Haes, et al., "Wide-Area Measurement System-Based Optimal Multi-Stage Under-Frequency Load-Shedding in Interconnected Smart Power Systems Using Evolutionary Computing Techniques", Appl. Sci. 2019, 9(3) 508; https://doi.org/10.3390/app9030508, Feb. 1, 2019, pp. 1-23.

Alshahrestani, Ahmad, et al., "WAMS Based Online Estimation of Total Inertia Constant and Damping Coefficient for Future Smart Grid Systems", 2018 Smart Grid Conference (SGC), 2018, pp. 1-5.

Ansari, Bananeh, et al., "Adaptive Wide-Area Primary Frequency Controller for Improving Power Grid Dynamic Performance", 2017 IEEE Power & Energy Society General Meeting doi: 10.1109/PESGM.2017.8273928., 2017, pp. 1-5.

Ariff, M., et al., "Estimating Dynamic Model Parameters for Adaptive Protection and Control in Power System", IEEE Transactions on Power Systems, vol. 30, No. 2, Mar. 2015, pp. 829-839.

Ashton, P M., et al., "Application of Phasor Measurement Units to Estimate Power System Inertial Frequency Response", 2013 IEEE Power & Energy Society General Meeting doi: 10.1109/PESMG.2013.6672671., 2013, pp. 1-5.

Badrzadeh, Babak, "Is electromagnetic transientmodelling and simulation of largepower systems necessary andpractical?", Energy Systems Intergration Group https://www.esig.energy/author/babak-badrzadeh-australian-energy-market-operator/, Jul. 6, 2020, pp. 1-7.

Bollinger, K E., et al., "Frequency Response Methods for Tuning Stabilizers to Damp out Tie-Line Power Oscillations: Theory and Field-Test Results", IEEE Transactions on Power Apparatus and Systems, vol. PAS-98, No. 5, Sep./Oct. 1979, pp. 1509-1515.

Cepeda, Jaime C., et al., "Real-time transient stability assessment based on centre-of-inertia estimation from phasor measurement unit records", IET Generation, Transmission & Distribution vol. 8, Iss. 8 doi: 10.1049/iet-gtd.2013.0616, Dec. 31, 2013, pp. 1363-1376.

Chen, Yujiao Di Zhang, et al., "Design of GPSS Based on Wide—area Measurement Signal", 2017 12th IEEE Conference on Industrial Electronics and Applications (ICIEA) doi: 10.1109/ICIEA.2017.8282939, 2017, pp. 745-749.

Chourey, Divyansh, "Frequency Spectrum-Based Optimal Design of Power System Stabilizer for Primary Frequency Control", 2017 International Conference on Information, Communication, Instrumentation and Control (ICICIC) doi: 10.1109/ICOMICON.2017.8279083, 2017, pp. 1-6.

Chow, Joe H., et al., "A Toolbox for Power System Dynamics and Control Engineering Education and Research", Transactions on Power Systems, vol. 7, No. 4, Nov. 1992, pp. 1559-1564.

Chow, Joe H, et al., "Power System Damping Controller Design Using Multiple Input Signals", IEEE Control Systems Magazine, vol. 20, No. 4 doi: 10.1109/37.856181., Aug. 2000, pp. 82-90.

Ciraci, Selim, et al., "FNCS: A Framework for Power System and Communication Networks Co-Simulation", Proceedings of the Symposium on Theory of Modeling & Simulation, Article No. 36, Apr. 2014, pp. 1-8.

Darbandsari, Amir, et al., "The Estimation of Inertia and Load Damping Constants Using Phasor Measurement Data", Smart Grid Conference (SGC), 2017, pp. 1-7.

Del Rosso, Alberto D., et al., "A Study of TCSC Controller Design for Power System Stability Improvement", IEEE Transactions on Power Systems, vol. 18, No. 4, Nov. 2003, pp. 1487-1496.

Demello, Francisco P., et al., "Concepts of Synchronous Machine Stability as Affected by Excitation Control", IEEE Transactions on Power Apparatus and Systems, vol. PAS-88, No. 4,, Apr. 1969, pp. 316-329.

Deng, Hui, et al., "Real-time transient instability detection based on perturbed voltage trajectories", Int. Trans. Electr. Energ. Syst. DOI: 10.1002/etep.1887, Feb. 15, 2014, pp. 1041-1058.

Diaz-Alzate, A F., et al., "Transient Stability Prediction for Real-Time Operation by Monitoring the Relative Angle with Predefined Thresholds", Energies, 12, 838 https://www.mdpi.com/1996-1073/12/5/838, Mar. 4, 2019, pp. 1-17.

Duan, Jie, et al., "Model predictive damping control of interconnected power system based on wide-area measurement information", Electrical Measurement & Instrumentation vol. 54 No. 10, May 25, 2017, pp. 1-6.

Dudgeon, Graham J.W., et al., "The Effective Role of AVR and PSS in Power Systems: Frequency Response Analysis", IEEE Transactions on Power Systems, vol. 22, No. 4, Nov. 2007, pp. 1986-1994.

Dysko, Adam, et al., "Enhanced Power System Stability by Coordinated PSS Design", Feb. 2010, pp. 413-422.

Elliott, Ryan T., et al., "A Generalized PSS Architecture for Balancing Transient and Small-Signal Response", IEEE Transactions on Power Systems (vol. 35, Issue: 2) DOI: https://doi.org/10.48550/arXiv.1908.10338, Sep. 2019, pp. 1-11.

Elliott, Ryan T., et al., "Stabilizing Transient Disturbances With Utility-Scale Inverter-Based Resources", Department of Electrical and Computer Engineering University of Washington, Nov. 30, 2020, pp. 1-31.

Gibbard, M.J., et al., "Small-Signal Stability, Control and Dynamic Performance of Power Systems", University of Adelaide Press, Adelaide, 2015, pp. 1-689.

Grondin, R., et al., "An Approach to PSS Design for Transient Stability Improvement through Supplementary Damping of the

(56) References Cited

OTHER PUBLICATIONS

Common Low-Frequency", IEEE Transactions on Power Systems, vol. 8, No. 3,, Aug. 1993, pp. 954-963.
Guo, Song , et al., "Synchronous Machine Inertia Constants Updating Using Wide Area Measurements", 2012 3rd IEEE PES Innovative Smart Grid Technologies Europe (ISGT Europe), Berlin, 2012, pp. 1-7.
Hopkinson, Kenneth , et al., "EPOCHS: A Platform for Agent-Based Electric Power and Communication Simulation Built From Commercial Off-the-Shelf Components", IEEE Transactions on Power Systems, vol. 21, No. 2, May 2006, pp. 548-558.
Hu, Wenping , et al., "Model of Power System Stabilizer Adapting to Multi-Operating Conditions of Local Power Grid and Parameter Tuning", Sustainability 2018, 10(6), 2089; https://doi.org/10.3390/su10062089, Jun. 20, 2018, pp. 1-18.
Huang, Dan , et al., "Wide-Area Measurement—Based Model-Free Approach for Online Power System Transient Stability Assessment", Energies 11, No. 4: 958. https://doi.org/10.3390/en11040958, Apr. 17, 2018, pp. 1-20.
Johansson, K. , et al., "Coordinating Power Oscillation Damping Control using Wide Area Measurements", 2009 IEEE/PES Power Systems Conference and Exposition doi: 10.1109/PSCE.2009.4840162, 2009, pp. 1-8.
Kadri, Riad , et al., "An Improved Maximum Power Point Tracking for Photovoltaic Grid-Connected Inverter Based on Voltage-Oriented Control", IEEE Transactions on Industrial Electronics, vol. 58, No. 1, Jan. 2011, pp. 66-75.
Kamwa, Innocent , et al., "Wide-Area Measurement Based Stabilizing Control of Large Power Systems—A Decentralized/Hierarchical Approach", IEEE Transactions on Power Systems, vol. 16, No. 1, Feb. 2001, pp. 136-153.
Kincic, Slaven , et al., "Chapter 4: Real-Time Transient Stability Analysis Implementation", Power Systems. Springer, Cham. https://doi.org/10.1007/978-3-030-44544-7_4, Nov. 14, 2020, pp. 205-291.
Klein, M. , "A Fundamental Study of Inter-Area Oscillations in Power Systems", Transactions on Power Systems, vol. 6, No. 3, Aug. 1991, pp. 914-921.
Korunovic, Lidija M., et al., "Recommended Parameter Values and Ranges of Most Frequently Used Static Load Models", IEEE Transactions on Power Systems, vol. 33, No. 6, Nov. 2018, pp. 5923-5934.
Kumar, Vinoth , et al., "Improvements in Synchronous Generator Parameter Tuning Using PMU Data", 2018 20th National Power Systems Conference (NPSC) doi: 10.1109/NPSC.2018.8771818., 2018, pp. 1-5.
Kundur, P. , et al., "Application of Power System Stabilizers for Enhancement of Overall System Stability", IEEE Transactions on Power Systems, vol. 4, No. 2, May 1989, pp. 614-626.
Kundur, Prabha , "Power Systems Stability and Control", Electric Power Research Institute | McGraw Hill; 1st edition, Jan. 22, 1994, pp. 1-1199.
Law, K T., et al., "Robust Controller Structure for Coordinated Power System Voltage Regulator and Stabilizer Design", IEEE Transactions on Control Systems Technology, vol. 2, No. 3,, Sep. 1994, pp. 220-232.

Li, Xiaocong , et al., "Design of Parameters for Power System Stabilizer Based on Measured Phase Frequency Characteristics", Proceedings of the CSU-EPSA vol. 29 No. 3 DOI : 10.3969/j.issn.1003-8930.2017.03.005, Mar. 2017, pp. 1-7.
Lin, Hua , et al., "GECO: Global Event-Driven Co-Simulation Framework for Interconnected Power System and Communication Network", IEEE Transactions on Smart Grid, vol. 3, No. 3, Sep. 2012, pp. 1444-1456.
Lu, Chao , et al., "Implementations and Experiences of Wide-area HVDC Damping Control in China Southern Power Grid", 2012 IEEE Power and Energy Society General Meeting doi: 10.1109/PESGM.2012.6345363, 2012, pp. 1-7.
Mahdiraji, Ebadollah Amouzad, "Introducing a New Method to Increase Critical Clearing Time (CCT) and Improve Transient Stability of Synchronous Generator Using Brake Resistance", Gazi Mühendislik Bilimleri Dergisi vol. 6, No. 2 https://dx.doi.org/10.30855/gmbd.2020.02.06, Jul. 12, 2020, pp. 138-144.
Masuda, Muneki , et al., "An Excitation System of Synchronous Generators Based on WAMS and Energy Function for Improvement of Transient Stability", 2018 IEEE PES Innovative Smart Grid Technologies Conference Europe (ISGT-Europe doi: 10.1109/ISGTEurope.2018.8571888., 2018, pp. 1-6.
Milano, Federico , "Rotor Speed-Free Estimation of the Frequency of the Center of Inertia", IEEE Transactions on Power Systems, vol. 33, No. 1, Jan. 2018, pp. 1153-1155.
Nedolivko, Aleksey , et al., "The Improvement of Intertie Transient Stability on the Basis of Wide Area Measurement System Data", 2017 IEEE Conference of Russian Young Researchers in Electrical and Electronic Engineering (ElConRus) doi: 10.1109/ElConRus.2017.7910715, 2017, pp. 958-962.
International Search Report and Written Opinion for PCT/US2020/028679 mailed on Jul. 1, 2020.
North American Electric Reliability Corporation, "Reliability Guidelines," <http://www.nerc.com/comm/OC_Reliability_Guidelines_DL/Inverter-Based_Resource_Performance_Guideline.pdf>, Sep. 2008.
Alhelou, et al., Wide-Area Measurement System-Based Optimal Multi-Stage Under-Frequency Load-Shedding in Interconnected Smart Power Systems Using Evolutionary Computing Techniques, Applied Sciences, Feb. 2019, 23 pages,.
Ansari, et al., Adaptive Wide-Area Primary Frequency Controller for Improving Power Grid Dynamic Performance, IEEE Power & Energy Society General Meeting, Jul. 2017, 1 page.
Gurrala, et al., Power System Stabilizers Design for Interconnected Power Systems, IEEE Transactions on Power Systems, vol. 25, Issue 2, May 2010, 1 page.
Milano, F. , "Extraneous Instabilities Arising in Power Systems with Non-Synchronous Distributed Energy Resources," <http://faraday1.ucd.ie/archive/papers/extraneouso.pdf>, May 17, 2011.
Tuttleberg, K. et al., "Estimation of Power System Inertia from Ambient Wide Area Measurements," <http://ntuopen.ntnu.no/ntnu-xmlui/bitstream/handle/11250/2579324/Uhlen-Estimation+of+Power+system.pdf?sequence=2>, 2018.

\* cited by examiner

SYSTEMS AND METHODS FOR POWER SYSTEM STABILIZATION AND OSCILLATION DAMPING CONTROL

CROSS-REFERENCE TO RELATED APPLICATION

This application is a 35 U.S.C. § 371 National Stage Application of PCT Application No. PCT/US2020/028679, filed Apr. 17, 2020, which claims the benefit under 35 U.S.C. § 119 of the earlier filing date of U.S. Provisional Application Ser. No. 62/835,885 filed Apr. 18, 2019, the entire contents of each are hereby incorporated by reference in their entirety for any purpose.

TECHNICAL FIELD

Examples described herein generally relate to the stabilization of power systems via oscillation damping control. Examples of determining an auxiliary input signal, based on global frequency measurements, used in damping control for synchronous and inverter-based resources (e.g., photovoltaic generation, energy storage) are described.

BACKGROUND

An electric power system (e.g., a power grid) is a network of electrical components deployed, often across vast geographical areas, to supply, transfer, and use electric power. Power systems include generators that supply power, transmission systems that carry power from the generating centers to the load centers, and distribution systems that feed power to nearby commercial and residential areas. One of the main difficulties in power system operations is load balancing, that is, ensuring power supply meets power demand which, if balanced, results in a stable power system. For example, the more load placed on a power system, the less stable it becomes. Oscillation damping plays a critical role in stabilizing the response of the power system to disturbances in the balance between the generation and demand.

The function of a power system stabilizer (PSS) is to improve the damping of the electromechanical modes of oscillation of a power system (e.g., the natural resonances of the system), and thus bolster power system stability. Generally, such damping is achieved by modulating a generator's excitation so as to develop components of electrical torque that are in phase with rotor speed deviations (e.g., instability caused by load fluctuations) For decades, PSS paired with high initial response automatic voltage regulators (AVRs) have served as an effective mechanism for meeting system stability requirements. As inverter-based variable generation (e.g., photovoltaic solar) displaces synchronous machines, electric grids lose inertia and traditional sources of voltage support and oscillation damping (e.g., power system stabilizers). Further, the rapid growth of power electronic loads (e.g., smartphones, laptops, flat screen televisions, etc.) is making the system load stiffer with respect to changes in voltage. Accordingly, large-scale power systems are rapidly changing to meet current and future demand and stability requirements. Methods that have traditionally assisted in power system stabilization in the past are no longer well-suited to meet current and projected demand and stability requirements, particularly in systems with reduced inertia.

SUMMARY

Embodiments described herein relate to systems and methods for improving power system stabilization and oscillation damping control using measurements collected over large geographical areas in nearly real time. In operation a computing device may receive frequency data from a plurality of sensors within a power system. Based at least on the received frequency data, the computing device may calculate an estimate of a speed of a center of inertia signal for the power system. In some embodiments, calculating the estimate of the speed of the center of inertia signal may be further based at least on a weighted average. In some embodiments, each sensor of the plurality of sensors within the power system has a corresponding weight, and each corresponding weight for each sensor of the plurality of sensors within the power system is an inertia constant, where each inertia constant is specific to each corresponding sensor.

A controller may calculate a control error signal for the power system. In some embodiments, calculating the control error signal for the power system may be based at least on the estimate of the speed of the center of inertia signal for the power system. The controller may calculate an auxiliary input signal, where calculating the auxiliary input signal may be based on based at least on applying a washout filter (e.g., a highpass filter) to the control error signal. In some examples, calculating the auxiliary input signal may be further based at least on utilizing a lead-lag compensator, where the lead-lag compensator phase-adjusts the control error signal.

An actuator may receive the auxiliary input signal and provide an output configured to improve a stability of the power system. In some examples, improving (e.g., increasing) the stability of the power system is based at least on the actuator utilizing the received auxiliary input signal to change a field current of the actuator.

In some embodiments, the power system comprises synchronous machinery. In further embodiments, the power system comprises inverter-based resources. In even further embodiments, the power system comprises a combination of synchronous machinery and inverter-based resources.

BRIEF DESCRIPTION OF THE DRAWINGS

Reference is now made to the following descriptions taken in conjunction with the accompanying drawings, in which.

DETAILED DESCRIPTION

Figure 1:
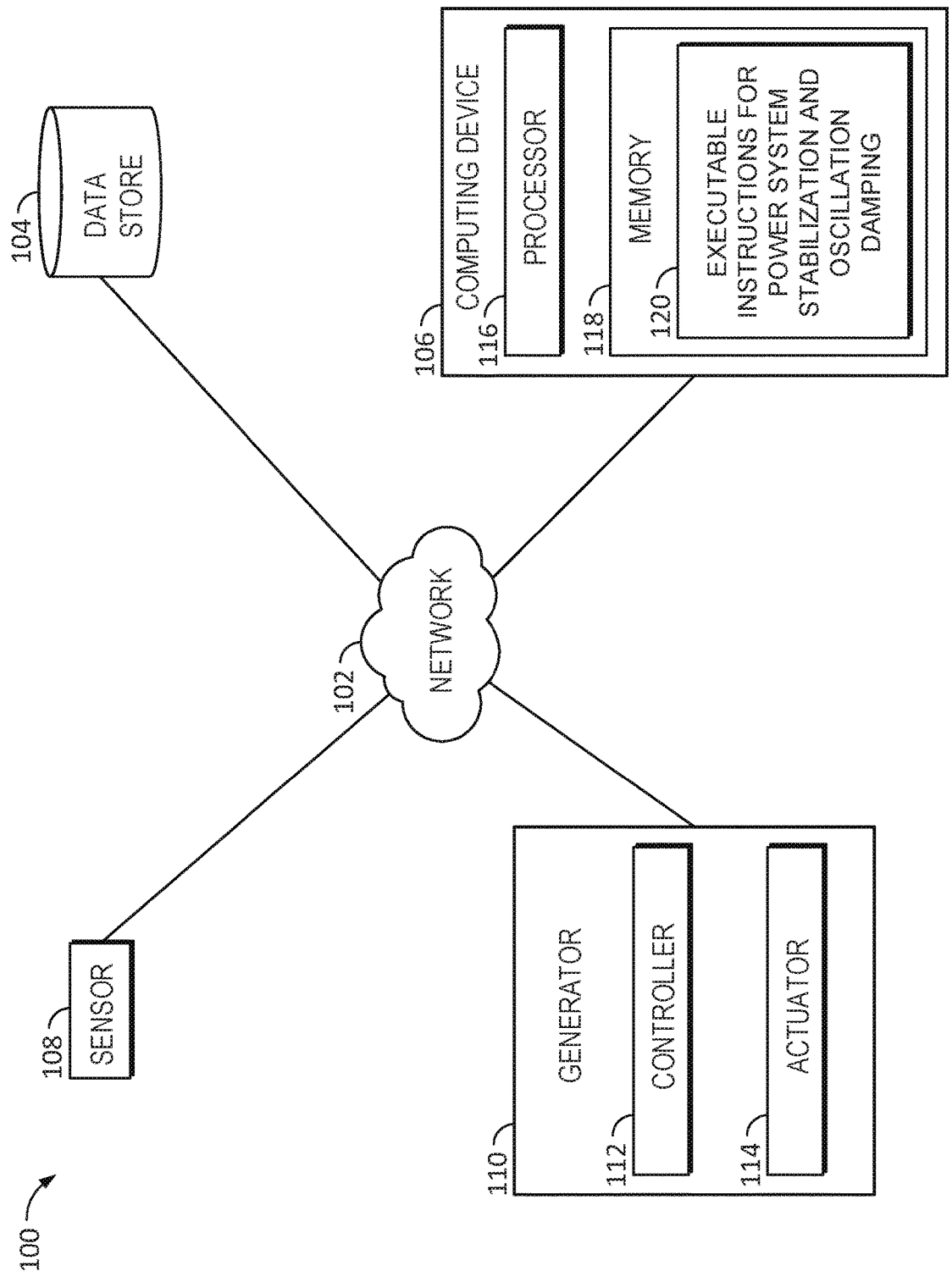
FIG. 1 is a schematic illustration of a system for balancing transient and small-signal response, arranged in accordance with examples described herein.

The following description of certain embodiments is merely exemplary in nature and is in no way intended to limit the scope of the disclosure or its applications or uses.

In the following detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Power systems play a vital role in everyday life. Power systems enable essential services such as businesses, schools, and hospitals to operate, streets and homes to properly function, and in some cases, for consumer and commercial vehicles to work. For power systems to remain operational, they must remain stable, that is, power systems must be able to balance power demand with available power supply at all times. If a power system becomes unstable, a major event, such as a system-wide power outage (e.g., a blackout) may occur. Synchronous generation (e.g., ac-connected rotating machinery) is being steadily displaced by an increasing proportion of inverter-based generation (e.g., photovoltaic solar). Correspondingly, the rapid growth of power electronic loads (e.g., smartphones, laptops, flat screen televisions, etc.) is making the system load stiffer with respect to changes in voltage. Ensuring stability and adequate oscillation damping as the dynamics of large-scale power systems change is of the utmost importance. Examples discussed herein pertain to techniques for improving power system stabilization and oscillation damping control using measurements collected over large geographical areas in nearly real time.

Various embodiments described herein are directed to systems and methods for improved power system stabilization and oscillation damping control. In some examples, a computing device may receive frequency data from a plurality of sensors within a power system. Based at least on the received frequency data, the computing device may calculate an estimate of a speed of a center of inertia signal for the power system. In some examples, calculating the estimate of the speed of the center of inertia signal is based on at least a weighted average of the received frequency data. A controller may calculate a control error signal for the power system based at least on the calculated estimate of the speed of the center of inertia signal for the power system. The controller may further calculate an auxiliary input signal. An actuator may receive the calculated auxiliary input signal and provide an output that improves (e.g., increases) the stability of the power system. In some examples, the actuator may improve the stability of the power system based at least on the actuator utilizing the received auxiliary input signal to change (e.g., modulate) field current on which the behavior (e.g., the output) of the actuator depends.

Currently available methods for damping oscillations in power systems suffer from a number of drawbacks. For example, many power system stabilizers (PSS) rely on localized data (e.g., information about the specific power plant, or a specific high-voltage substation, etc.) as the exclusive source of information to synthesize the feedback control signal. More specifically, many traditional PSS systems still utilize the delta omega ($\Delta\omega$) formulation, where the PSS collects a measurement of a local rotor speed associated with a local generation unit. Using that single, localized measurement, the system subtracts a known value (e.g., a reference) to compute a control error. Using the control error calculated from the single, localized measurement, the system automatically adjusts the excitation to modulate the electrical torque on the shaft of the machine. In the past, these systems may have been preferred due to the unavailability of global information (e.g., the inability to obtain data measurements from more than one power plant or high-voltage substation) and the unreliability of telecommunications systems to disseminate remote measurements throughout a power system; however, such localized systems can degrade voltage response and transient stability by counteracting the voltage signal sent to the exciter by the automatic voltage regulator (AVR). Furthermore, control techniques that utilize only local information also possess limited flexibility, making it difficult to prioritize the damping of particular types of oscillatory modes (e.g., local, inter-area, frequency regulation).

While many currently available power system stabilization techniques rely exclusively on local information, the advancement of telecommunications reliability and of wide-area measurement systems (WAMS) has encouraged attempts to implement a more global approach to power system oscillation damping. For example, some current power systems utilize wide-area damping control (e.g., a differential wide-area control strategy). Here, the differential feedback system measures the frequency at two points in the system (e.g., at each end of a high-voltage dc transmission line). Based on these two measurements, the system calculates a control error signal that is used to modulate the power transfer on the line to dampen oscillations as they arise. While differential systems (e.g., two-point systems) attempt to incorporate a more global view of the entire power system into feedback control strategies, they too suffer from a number of drawbacks. For example, such differential feedback systems only have controllability to dampen a limited number oscillatory modes of the power system (e.g., they are only capable of improving oscillation damping under specific circumstances or operating conditions). Further, these systems create a single point of failure, that is, they rely on one or two actuators to maintain stability, which makes the system inequitable and susceptible to major events (e.g., cascading outages) arising due to loss of communication.

Accordingly, embodiments described herein are generally directed towards improved damping of power system oscillations via feedback control. In this regard, embodiments described herein enable improvements in power system stabilization and oscillation damping control by receiving frequency data (e.g., frequency measurements, frequency signals, etc.) from a plurality of sensors (e.g., phasor measurement units, also called PMUs) within a power system (e.g., a power grid). In some examples, each sensor of the plurality of sensors has an associated weight, where the weight is a sensor-specific inertia constant. In some examples, each inertia constant corresponds to the size of the generator with which the sensor is associated. In some examples, each frequency measurement may include time stamp information from, for example, incoming GPS satellite signals. In some examples, the frequency data may be received in near real-time using, for example, fiber optic communication systems (e.g., very low latency).

In some examples, rather than frequency data, bus voltage angle data (e.g., bus voltage angle measurements) may be received from each sensor of the plurality of sensors within the power system. In some examples, the computing device may calculate or determine frequency data for each sensor in the plurality of sensors based on the received bus voltage angle data from each sensor.

Based at least on the received frequency data, the computing device may calculate an estimate of a speed of a center of inertia signal for the power system. In some examples, calculating the estimate of the speed of the center of inertia signal is based at least on a weighted average of the received frequency data.

In some examples, a controller may calculate a control error signal for the power system based at least on the calculated estimate of the speed of the center of inertia signal for the power system. The controller may further calculate an auxiliary input signal. In some examples, calculating the auxiliary input signal may be based on applying a washout filter to the control error. In some cases, the washout filter may be a high-pass filter. In some examples, calculating the auxiliary input signal may be further based on utilizing a lead-lag compensator, where the lead-lag compensator phase-adjusts the control error.

In some examples, an actuator may receive the calculated auxiliary input signal and provide an output that improves the stability of the power system. In some examples, the actuator may improve the stability of the power system based at least on the actuator utilizing the received auxiliary input signal to change a field current of the actuator. In some examples, the power system may comprise synchronous machinery, inverter-based resources, or a combination thereof. Examples of synchronous machinery includes systems that are actually synchronous, nearly synchronous, or generally are capable of converting mechanical power from a prime mover into electrical power at a particular voltage and frequency, and, that have an exciter capable of responding to excitation signals (e.g., auxiliary input signals). Examples of inverter-based resources include photovoltaic solar panels, wind turbines, battery energy storage systems, and the like, having inverters.

Advantageously, systems and methods described herein utilize a global information approach to power system stabilization and oscillation damping control. Examples of such control systems and methods utilize near real-time estimates of the center of inertia speed for the whole power system derived from wide-area frequency measurements obtained by sensors distributed throughout the power system (e.g., at power plants, high-voltage substations, etc.) to improve oscillation damping. Not only do the systems and methods described herein improve the damping of both local and inter-area modes of oscillation throughout a power system, the ability of the PSS to improve damping is decoupled from its role in shaping the system response to transient disturbances. Consequently, the interaction between the PSS and an automatic voltage regulator (AVR) can be fine-tuned based on varying voltage requirements. Moreover, while systems and methods described herein take advantage of the availability of global information as well as improvements in telecommunications reliability to improve damping control, they are also tolerant of communication delay, traffic congestion, and jitter (e.g., random variation in latency).

While various drawbacks of existing systems and possible advantages of examples described herein are discussed herein, it is to be understood that these drawbacks and possible advantages are provided to facilitate appreciation of described examples only. Not all examples of the described technology may address all, or any, of the described drawbacks. Not all examples of the described technology may have all, or any, of the described advantages.

FIG. 1 is a schematic illustration of a system 100 for improved power system stabilization and oscillation damping control (e.g., a damping control system), in accordance with examples described herein. It should be understood that this and other arrangements and elements (e.g., machines, interfaces, function, orders, and groupings of functions, etc.) can be used in addition to or instead of those shown, and some elements may be omitted altogether. Further, many of the elements described may be implemented as discrete or distributed components or in conjunction with other components, and in any suitable combination and location. Various functions described herein as being performed by one or more components may be carried out by firmware, hardware, and/or software. For instance, and as described herein, various functions may be carried out by a processor executing instructions stored in memory.

Among other components not shown, system 100 of FIG. 1 includes data store 104, computing device 106, sensor 108, and generator 110. Computing device 106 includes processor 116, and memory 118. Memory 118 includes (e.g., may be encoded with) executable instructions for power system stabilization and oscillation damping control 120. Generator 110 includes controller 112 and actuator 114. It should be understood that system 100 shown in FIG. 1 is an example of one suitable architecture for implementing certain aspects of the present disclosure. Additional, fewer, and/or different components may be used in other examples. It should be noted that implementations of the present disclosure are equally applicable to other types of devices such as mobile computing devices and devices accepting gesture, touch, and/or voice input. Any and all such variations, and any combination thereof, are contemplated to be within the scope of implementations of the present disclosure. Further, although illustrated as separate components of computing device 106, any number of components can be used to perform the functionality described herein. Although illustrated as being a part of computing device 106, the components can be distributed via any number of devices. For example, processor 116 can be provided via one device, sever, or cluster of servers, while memory 118 may be provided via another device, server, or cluster of servers.

As shown in FIG. 1, computing device 106, sensor 108, and generator 110 may commutate with each other via network 102, which may include, without limitation, one or more local area networks (LANs) and/or wide-area networks (WANs). Such networking environments are commonplace in offices, enterprise-wide computer networks, laboratories, homes, intranets, and the Internet. Accordingly, network 102 is not further described herein. It should be understood that any number of computing devices, sensors, and/or generators may be employed within system 100 within the scope of implementations of the present disclosure. Each may comprise a single device or multiple devices cooperating in a distributed environment. For instance, computing device 106 could be provided by multiple server devices collectively providing the functionality of computing device 106 as described herein. Additionally, other components not shown may also be included within the network environment.

Computing device 106, sensor 108, and generator 110 may have access via network 102) to at least one data store or repository, such as data store 104, which may include any data related to frequency data and accompanying timestamp data, bus voltage angle data along with accompanying time stamp data, as well as any associated metadata therewith.

Data store 104 may further include any data related to techniques for calculating an estimate of the center of the speed of inertia signal for a power system, techniques for calculating a control error signal, as well as techniques for calculating an auxiliary input signal. In implementations of the present disclosure, data store 104 may be searchable for one or more of the data related to frequency data, bus voltage angle data, as well as techniques for calculating a center of the speed of inertia signal for a power system, a control error signal, and/or an auxiliary input signal, described herein.

Such information stored in data store 104 may be accessible to any component of system 100. The content and volume of such information are not intended to limit the scope of aspects of the present technology in any way. Further, data store 104 may be a single, independent component (as shown) or a plurality of storage devices, for instance, a database cluster, portions of which may reside in association with computing device 106, sensor 108, generator 110, another external computing device (not shown), and/or any combination thereof. Additionally, data store 104 may include a plurality of unrelated data repositories or sources within the scope of embodiments of the present technology. Data store 104 may be local to computing device 106, sensor 108, or generator 110. Data store 104 may be updated at any time, including an increase and/or decrease in the amount and/or types of data related to frequency data, bus voltage angle data, as well as techniques for calculating a center of the speed of inertia signal for a power system, a control error signal, and/or an auxiliary input signal (and all accompanying metadata).

Examples of sensor 108 described herein may generally implement the collection of frequency data (e.g., frequency measurements, frequency signals, etc.). In some examples, sensor 108 may be collocated with a power plant. In further examples, sensor 108 may be collocated with a high-voltage substation. In even further examples, sensor 108 may be collocated with neither a power plant nor a high-voltage substation, but rather distributed at some other location throughout the power system. In some examples, sensor 108 is one of a plurality of sensors capable of collecting frequency data, distributed throughout the power system. In some examples, additionally and/or alternatively, sensor 108 may collect bus voltage angle data (e.g., bus voltage angle measurements, bus voltage angle signals, etc.). In some examples, additionally and/or alternatively, sensor 108 may, for each frequency measurement and/or bus voltage angle measurement, collect corresponding time stamp information. In some examples, sensor 108 may collect the corresponding time stamp information from, for example, incoming GPS satellite signals, or the like, for each collected frequency measurement and/or bus voltage angle measurement. Examples of sensors which may be used include, for example, voltage sensors, current sensors, and/or phasor measurement units.

In some examples, sensor 108 has an associated weight, where the associated weight is a sensor-specific inertia constant. In some examples, the sensor-specific inertia constant corresponds to the size of the generator with which the sensor is associated. As should be appreciated, sensor 108 may be any device capable of collecting frequency, bus voltage angle data, and/or time stamp information such as, for example, a phasor measurement unit (PMU). The sensor-specific inertia constant may be stored in a location accessible to the system, such as in data store 104.

Examples herein may include computing devices, such as computing device 106 of FIG. 1. Computing device 106 may in some examples be integrated with one or more sensors and/or one or more generators described herein. Computing device 106 may further be centralized, e.g., not integrated with one or more sensors and/or one or more generators described herein. In some examples, computing device 106 may be implemented using one or more computers, servers, smart phones, smart devices, or tablets. Computing device 106 may facilitate improved power system stabilization and oscillation damping control. Computing device 106 may include computer readable media encoded with executable instructions and a processor that may execute the instructions to provide for power system stabilization and oscillation damping control. As described herein, computing device 106 includes processor 116 and memory 118. Memory 118 may include executable instructions for power system stabilization and oscillation damping control 120. In some embodiments, computing device 106 may be physically coupled to sensor 108 and/or generator 110 (e.g., the components may be integrated and/or may be connected using a wired interface, such as bus, interconnect, board, etc.). In other embodiments, computing device 106 may not be physically coupled to sensor 108 and/or generator 110 but collocated with the sensor and/or the generator. In even further embodiments, computing device 106 may neither be physically coupled to sensor 108 and/or generator 110 nor collocated with the sensor and/or the generator. Data provided by the sensor 108 may be stored in a location accessible to other components in the system in some examples.

While a single sensor 108 is shown in FIG. 1, any number may be used. Generally, systems described herein may include sensors distributed throughout the system. In some examples, a sensor may be provided for each generating device in the system. In some examples, a sensor may be provided for a representative sample of generating devices in the system (e.g., at least 10 percent of the generating devices in the system in some examples, at least 20 percent in some examples, at least 30 percent in some examples, at least 40 percent in some examples, at least 50 percent in some examples, at least 60 percent in some examples, at least 70 percent in some examples, at least 80 percent in some examples, at least 90 percent in some examples).

Computing devices, such as computing device 106 described herein may include one or more processors, such as processor 116. Any kind and/or number of processor may be present, including one or more central processing unit(s) (CPUs), graphics processing units (GPUs), other computer processors, mobile processors, digital signal processors (DSPs), microprocessors, computer chips, and/or processing units configured to execute machine-language instructions and process data, such as executable instructions for power system stabilization and oscillation damping control 120.

Computing devices, such as computing device 106, described herein may further include memory 118. Any type or kind of memory may be present (e.g., read only memory (ROM), random access memory (RAM), solid state drive (SSD), and secure digital card (SD card). While a single box is depicted as memory 118, any number of memory devices may be present. The memory 118 may be in communication (e.g., electrically connected) to processor 116.

Memory 118 may store executable instructions for execution by the processor 116, such as executable instructions for power system stabilization and oscillation damping control 120. Processor 116, being communicatively coupled to sensor 108 and generator 110, and via the execution of executable instructions for power system stabilization and oscillation damping control 120, may calculate an estimate for a speed of a center of inertia signal for the power system based at least on collected frequency data and/or bus voltage data received by sensors distributed throughout the power system, such as sensor 108. In some embodiments, and as described herein, calculating the estimate of the speed of the center of inertia signal for the power system is further based at least on a weighted average, where each sensor, e.g., sensor 108, of the plurality of sensors within the power system has a corresponding weight. In some cases, each corresponding weight for each sensor, e.g., sensor 108, of the plurality of sensors within the power system is an inertia constant, where each inertia constant is specific to each corresponding sensor.

Calculating an estimate of a speed of a center of inertia signal of a power system can be mathematically represented as the following:

$$\omega_c(t) = \frac{\sum_{i \in I} H_i \omega_i(t)}{\sum_{i \in I} H_i} \quad \text{Equation (1)}$$

where i is the unit index, I the set of all online (e.g., committed) conventional generators within a power system, and H is the inertia constant. As described throughout, modern power system stabilizers may utilize the reliability of telecommunications as well as access to wide-area measurements to create control systems that are equipped to handle current and future demand and stability requirements.

Because rotor speed measurements of current power systems are seldom available through wide-area measurement systems, however, this may prevent the center-of-inertia definition illustrated in equation (1) from being evaluated onboard a real-time control system. Further, the inertia constants in equation (1) may not be known or available at all times due to changes in the unit commitment and dispatch. Instead, a real-time (or near real-time or time-based) estimate of the speed of the center of inertia signal may be calculated, e.g., by processor 116, using a weighted average of frequency measurements (or processed bus voltage angle measurements) collected from sensors, such as sensor 108, distributed throughout a power system (e.g., $\overline{\omega}(t) \approx \omega_c(t)$) where $\omega_c(t)$ is the center-of-inertia speed as described above, and $\overline{\omega}(t)$ is an estimate of the center-of-inertia speed using a weighted average of frequency measurements collected from the sensors.

The estimate of the center of the speed of inertia signal of a power system may be mathematically represented as the following:

$$\overline{\omega}(t) = \frac{1}{f_0} \sum_{k \in \mathcal{K}} \alpha_k f_k(t) \quad \text{Equation (2)}$$

where k is the sensor index, and $f_0$ is the nominal system frequency. The frequency signal reported by the kth sensor is denoted by $f_k(t)$, and the associated sensor weight by $\alpha_k$. The sensor weights (e.g., associated, normalized sensor-specific inertia constants) may be nonnegative and sum to 1, e.g., $1^T \alpha = 1$. For simplicity, in some examples, the arithmetic mean may be considered in which $\alpha_k = 1/|\mathcal{K}|$ for all k, where $|\mathcal{K}|$ denotes the cardinality of $\mathcal{K}$ or simply the number of available sensors distributed throughout the power system. In this manner, the estimate of the speed of the center of inertia may generally correspond to a weighted sum of sensor signals. The estimate of the speed of the center of inertia may further be normalized using a nominal system frequency. As should be appreciated however, this example is in no way limiting, and other examples not described are contemplated within the scope of this disclosure.

Examples herein may include generators (e.g., generating devices, resources), such as generator 110 of FIG. 1. Generator 110 may in some examples be integrated with one or more sensors and/or one or more computing devices described herein. Generator 110 may further be remote, e.g., not integrated with one or more sensors and/or one or more computing devices described herein. Examples of generators described herein may include synchronous machinery, inverter-based resources, or a combination thereof. As used herein, synchronous machines include machinery that converts the mechanical power from a prime mover into electrical power at a particular voltage and frequency, and, that has an exciter capable of responding to excitation signals (e.g., auxiliary input signals). Examples of synchronous machinery include, but are not limited to, gas turbines, hydroelectric synchronous generators, and the like. As used herein, inverter-based resources include generators that has a front-end controller that specifies an active current command (e.g., the component of the current that adjusts the real power output of the inverter). Alternatively, the front-end controller may specify a commanded voltage phasor (e.g., as in grid-forming inverters). Examples of inverter-based resources include, but are not limited to, photovoltaic solar panels, wind turbines, battery energy storage systems, and the like. Examples of generators described herein may include resources other than synchronous machinery and/or inverter-based resources. In some examples, generator 110 may include any resource capable of modulating power (e.g., either real or reactive). As one example, generator 110 may include a battery-based storage system, which would be suitable for the damping control strategy described herein. While only one generator is shown in system 100, system 100 may include more than one generator. As should be appreciated, while only synchronous machinery, inverter-based resources, and battery-powered resources are described as examples of generator 110, these examples are in no way limiting, and other generators and/or resources suitable for the damping control strategy described herein are contemplated to be within the scope of this disclosure.

Generator 110 as described herein includes controller 112 and actuator 114. In some examples, controller 112 may calculate a control error signal for the power system, using, for example, equation (7). In some examples, calculating the control error signal for the power system is based at least on the estimate of the speed of the center of inertia signal for the power system (e.g., equation (2)).

Recall that the nonlinear swing equation in terms of the per-unit accelerating power, can be written mathematically as the following:

$$\dot{\omega}(t) = -\frac{D}{2H}[\omega(t) - \omega_0] + \frac{1}{2H\omega(t)}[P_m(t) - P_e(t)] \quad \text{Equation (3)}$$

where $\omega_0$ is the per-unit synchronous speed, D is the damping coefficient, and H is the inertia constant.

Linearizing equation (3), about a nonequilibrium trajectory yields the following:

$$\Delta\dot{\omega}(t) = -\left[\frac{D}{2H} + \frac{\overline{P}_m(t) - \overline{P}_e(t)}{2H\overline{\omega}(t)^2}\right]\Delta\omega(t) + \frac{1}{2H\overline{\omega}(t)}[\Delta P_m(t) - \Delta P_e(t)] \quad \text{Equation (4)}$$

where $$\Delta\omega(t) = \omega(t) - \overline{\omega}(t), \Delta P_m = P_m(t) - \overline{P}_m(t), \text{ and}$$

$$\Delta P_e(t) = P_e(t) - \overline{P}_e(t).$$

A new damping coefficient arises from analysis of equation (4), which can be written as:

$$\mathcal{D}(t) = D + \frac{\overline{P}_m(t) - \overline{P}_e(t)}{\overline{\omega}(t)^2} \quad \text{Equation (5)}$$

Using the coefficient $\mathcal{D}(t)$, equation (4) can be rewritten as the following:

$$\Delta\dot{\omega}(t) = -\frac{\mathcal{D}(t)}{2H}\Delta\omega(t) + \frac{1}{2H\overline{\omega}(t)}[\Delta P_m(t) - \Delta P_e(t)] \quad \text{Equation (6)}$$

The control strategy stemming from equation (6) can be generalized to encompass a Δω-type PSS. Splitting the linear time-invariant (LTI) control error (Δω(t)) into two constituent parts and taking the linear combination yields the following:

$$\Delta v(t) \triangleq \beta_1[\omega_i(t) - \overline{\omega}(t)] + \beta_2[\overline{\omega}(t) - \omega_0] \quad \text{Equation (7)}$$

where $\beta_1$ and $\beta_2$ are independent parameters that may be restricted to the unit interval, e.g., $\beta_1 \in [0,1]$ and $\beta_2 \in [0,1]$. The variable $\omega_i(t)$ is the local rotor speed signal (e.g., during a disturbance), and $\overline{\omega}(t)$ is the calculated estimate of the speed of the center of inertia for the system (e.g., a time-varying reference signal we are trying to push the local machine speed towards, rather than a static equilibrium), and $\omega_0$ corresponds to the synchronous speed of the machine (e.g., the speed the machine is operating at when its electrical frequency is 60 Hz).

Expanding the second term in equation (7), we see that control error Δv(t) can be written as follows:

$$\Delta v(t) = \beta_1[\omega_i(t) - \overline{\omega}(t)] + \beta_2\overline{\omega}(t) - \beta_2\omega_0 \quad \text{Equation (8)}$$

Accordingly, the control error signal may be calculated based on combination of a component proportional to the estimate of the speed of the center of inertia for the system, a component proportional to the synchronous speed of the machine, and a component proportional to a difference between a rotor speed and the speed of the center of inertia of the system. The control error signal in equation (7) may be constructed with a constant reference and a single feedback signal, illustrated as the following:

$$\Delta v(t) = v(t) - v_{ref}, \text{ where} \quad \text{Equation (9)}$$

$$v_{ref} = \beta_2\omega_0, \text{ and} \quad \text{Equation (11)}$$

$$v(t) = \beta_1[\omega_i(t) - \overline{\omega}(t)] + \beta_2\overline{\omega}(t)$$

With further refinement, the per-unit synchronous speed $\omega_0$ may serve as a reference. The controller error signal (e.g., equation (8)) may be divided by $\beta_2$, taking care to account for an example case where $\beta_2=0$. Beginning with the control error signal, note that $$\Delta\tilde{\omega}(t) \triangleq \tilde{\omega}(t) - \omega_0 \quad \text{Equation (12)}$$

The feedback signal $\tilde{\omega}(t)$ may then be given by the following $$\tilde{\omega}(t) = \begin{cases} (\beta_1/\beta_2)[\omega_i(t) - \overline{\omega}(t)] + \overline{\omega}(t), & \text{for } \beta_2 > 0 \\ \beta_1[\omega_i(t) - \overline{\omega}(t)] + \omega_0, & \text{for } \beta_2 = 0 \end{cases} \quad \text{Equation (13)}$$

This construction may be analogous to a traditional Δω-type power system stabilizer in which the local speed measurement with $\omega_i(t)$ has been replaced by $\tilde{\omega}(t)$. Note that when $\beta_1$ and $\beta_2$ are equal and nonzero the feedback signal may become $\omega(t)=_i(t)$ FIG. 3 (discussed herein) shows how the simplified PSS block diagram fits in the context of an excitation system with an AVR. This form may be equivalent to the one outlined in equations (9)-(11), provided that the downstream gain K is scaled appropriately. Accordingly, controllers described herein may calculate feedback signals based on estimates of the center of inertia of the power system(s) they are participating in.

In some examples, controller 112 may further calculate an auxiliary output signal (e.g., block 208 of FIG. 2) based at least on applying a washout filter (e.g., washout filter box 204 of FIG. 2) to the calculated control error signal. In some cases the washout filter may be a highpass filter. In some examples, controller 112 may further calculate the auxiliary output signal (e.g., block 208 of FIG. 2) based at least on utilizing a lead-lag compensator (e.g., lead-lag compensator box 206 of FIG. 2), where the lead-lag compensator phase-adjusts the control error signal. In some examples, more than one lead-lag compensation stage may be utilized. In other examples, no lead-lag compensation stage may be utilized. In some examples, actuator 114 may improve the stability of the power system based at least on the actuator utilizing the received auxiliary input signal to change a field current of actuator 114 (e.g., provide damping torque to stabilize the system).

Figure 2:
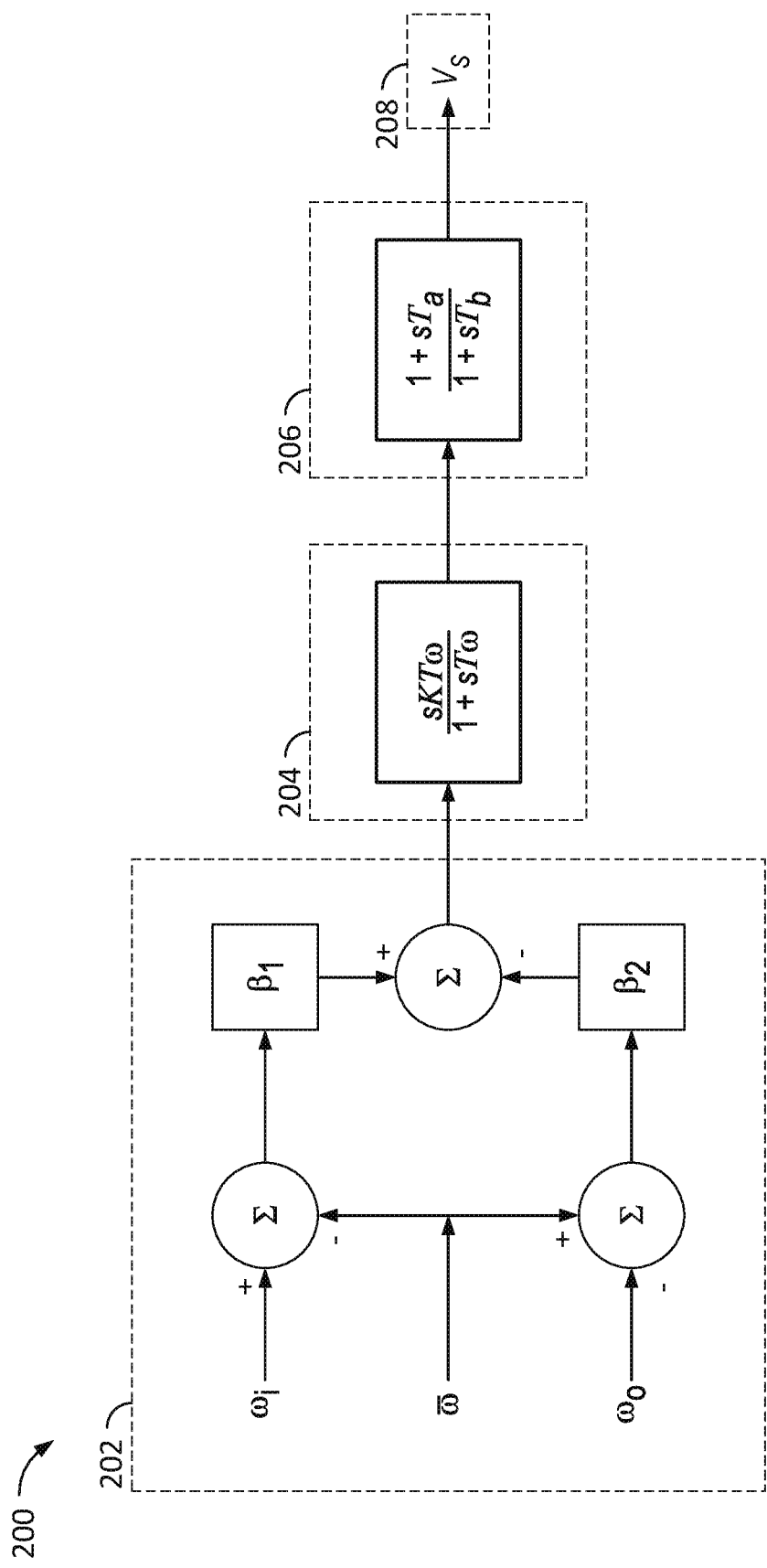
FIG. 2 illustrates a schematic illustration of calculating an auxiliary input signal, in accordance with examples described herein.

Turning now to FIG. 2, FIG. 2 illustrates a schematic illustration of calculating an auxiliary input signal, in accordance with examples described herein. Stated differently, FIG. 2 is a block diagram corresponding to the improved damping control described herein, where $v_s$ is the output of the power system stabilizer. FIG. 2 includes control error signal calculation block 202, washout filter block 204, lead-lag compensator block 206, and auxiliary input signal block 208.

In examples described herein, a controller, such as controller 112 may calculate a control error signal based at least on the calculated estimate of the speed of the center of inertia, calculated by a computing device, such as computing device 106. Block 202 is a visual representation of an example control error signal calculation performed by, for example, controller 112 of generator 110. Other computing devices and/or circuitry may calculate a control error signal as described herein in other examples, and may provide the result to controller 112 or other components described herein. As shown in FIG. 2, to calculate the control error signal at block 202, controller 112 utilizes a linear combination of three inputs, namely $\omega_r(t)$, $\bar{\omega}(t)$, and $\omega_0$. As described herein, $\omega_r(t)$ is the time-varying rotor speed signal (e.g., local rotor speed during a disturbance), $\bar{\omega}(t)$ is the calculated estimate of the speed of the center of inertia for the system) (e.g., a time-varying signal we are trying to push the local machine speed towards, rather than back to a static equilibrium), and $\omega_0$ is corresponds to the synchronous speed of the machine (e.g., the speed the machine is operating at when its electrical frequency is 60 Hz).

As described herein, controller 112 may further calculate an auxiliary output signal for the power system. In some examples, controller 112 may calculate the auxiliary output signal for the power system by applying a washout filter, such as, for example, a highpass filter, to the calculated control error signal. Block 204 is a visual representation of the application of a washout filter to the calculated control error signal calculated at block 202, by a controller, such as controller 112 of generator 110.

As described herein, controller 112 may further calculate an auxiliary output signal for the power system by utilizing a lead-lag compensator on the filtered control error signal, filtered at block 204. Block 206 is a visual representation of the utilization of a lead-lag compensator on a filtered control error signal, by a controller, such as controller 112 of generator 110. As described here, by utilizing a lead-lag compensator at block 206, controller 112 may phase-adjusts the control error. Block 208 is a visual representation of the auxiliary output signal ($v_s$), output by controller 112 of generator 110.

Figure 3:
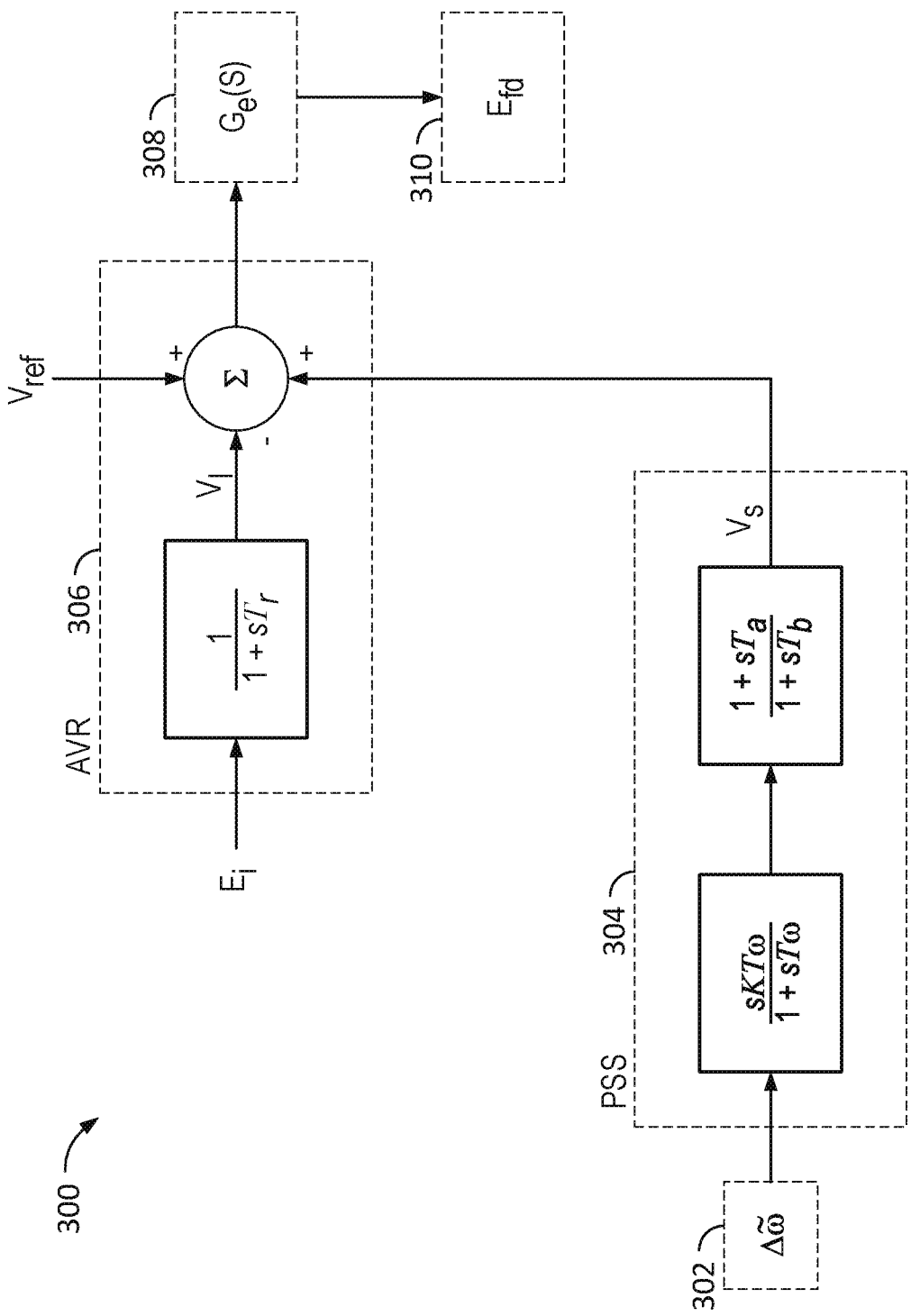
FIG. 3 illustrates a schematic illustration of using a calculated auxiliary input signal as an input into the exciter of a synchronous machine, in accordance with examples described herein.

Turning now to FIG. 3, FIG. 3 illustrates a schematic illustration of using a calculated auxiliary input signal as an input into the exciter of a synchronous machine, in accordance with examples described herein. FIG. 3 includes control error signal calculation block 302, auxiliary output signal block 304, voltage regulator block 306, transfer function block 308, and exciter output block 310.

In examples described herein, a controller, such as controller 112 may calculate a control error signal based at least on the calculated estimate of the speed of the center of inertia, calculated by a computing device, such as computing device 106. Block 302 is a visual representation of a control error signal, calculated by, for example, controller 112 of generator 110, used as input into a PSS architecture. Here, the $\Delta\tilde{\omega}$ is a further refinement of the control error calculated by controller 112. In other words, $\Delta\tilde{\omega}$ (e.g., equation (12)) is a further refinement of equation (7).

As described herein, controller 112 may calculate an auxiliary output signal for the power system. In some examples, controller 112 may calculate the auxiliary output signal for the power system by applying a washout filter, such as, for example, a highpass filter, to the calculated control error signal. Block 304 is a visual representation of the application of a washout filter to the calculated control error signal, as well as the utilization of a lead-lag compensator applied to the filtered control error signal, by controller 112 of generator 110. By utilizing a lead-lag compensator at block 304, controller 112 may phase-adjusts the filtered control error signal. As shown, block 304 further includes the calculated auxiliary output signal (e.g., $v_s$), calculated by controller 112.

As described herein, an automatic voltage regulator (AVR) is generally coupled to a generator, and is used to stabilize the generator's voltage as the load on the generator changes. Block 306 is a visual representation of an AVR coupled to synchronous generator. At block 306, the AVR receives the auxiliary output calculated by a controller, such as controller 112. As described herein, the calculated auxiliary signal may be used to improve the stability of the power system, by, for example, changing the filed current of the actuator. Block 308 is a visual representation of a transfer function of the exciter. Block 310 is a visual representation of exciter output, output by the AVR, based on the calculated control error signal.

Figure 4:
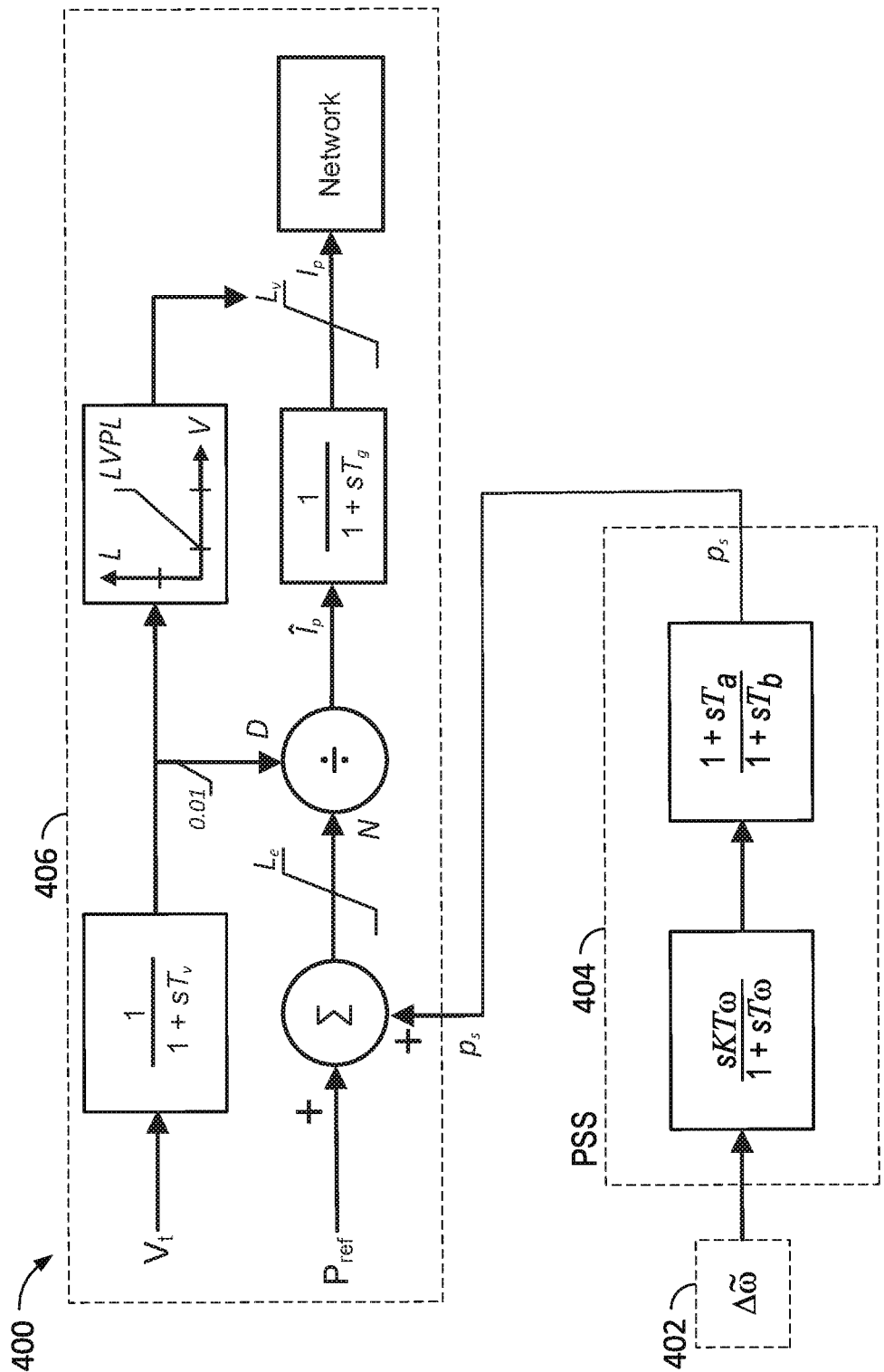
FIG. 4 illustrates a schematic illustration of using a calculated auxiliary input signal as an input into a front-end controller of an inverter-based resource, in accordance with examples described herein.

Turing now to FIG. 4, FIG. 4 illustrates a schematic illustration of using a calculated auxiliary input signal as an input into a front-end controller of an inverter-based resource, in accordance with examples described herein. FIG. 4 includes control error signal calculation block 402, auxiliary output signal block 404, and inverter-based resource block 406.

In examples described herein, a controller, such as controller 112 may calculate a control error signal based at least on the calculated estimate of the speed of the center of inertia, calculated by a computing device, such as computing device 106. Block 402 is a visual representation of a control error signal, calculated by, for example, controller 112 of generator 110, used as input into a PSS architecture. Here, the $\Delta\tilde{\omega}$ is a further refinement of the control error calculated by controller 112. In other words, $\Delta\tilde{\omega}$ (e.g., equation (12)) is a further refinement of equation (7).

As described herein, controller 112 may calculate an auxiliary output signal for the power system. In some examples, controller 112 may calculate the auxiliary output signal for the power system by applying a washout filter, such as, for example, a highpass to the calculated control error signal. Block 404 is a visual representation of the application of a washout filter to the calculated control error signal, as well as the utilization of a lead-lag compensator applied to the filtered control error signal, by controller 112 of generator 110. By utilizing a lead-lag compensator at block 404, controller 112 may phase-adjusts the filtered control error signal. As shown, block 404 further includes the calculated auxiliary output signal (e.g., $p_s$), calculated by controller 112. As should be appreciated, the output of the control structure, labeled $v_s$ in the context of a PSS, is represented as $p_s$ in FIG. 4. In other words, $p_s$ is the stabilizing signal produced by the generalized damping controller, such as controller 112, described herein.

Inverter-based resource block 406 is a visual representation of an inverter-based resource that may be used in conjunction with the damping control strategy described herein. Here $P_{ref}$ denotes the real power setpoint and $p_s$ the stabilizing signal produced by the generalized damping controller. The active current command $\hat{I}_p$ is generated by dividing the output of the summing block by a measurement of the terminal voltage, $V_t$. In the division operator, N stands for numerator and D for denominator. The lower bound on the terminal voltage measurement may prevent numerical errors and excessively large current commands. The converter may then apply some saturation/control limits, which may be voltage dependent, in order to determine the actual active current injection $I_p$.

As shown in inverter-based resource block 406, inverter-based resources may be used in conjunction with the generalized damping control strategy described herein in at least, for example, two ways. First, the output of the control structure, labeled $p_s$ in FIG. 4, may be added to the active power setpoint of the inverter. In some embodiments, this may cause the device to modulate its active current injection based on the wide-area stabilizing signal synthesized by the controller, such as controller 112. This paradigm may be appropriate for inverter-based resources, such as, for example, battery energy storage systems, photovoltaic solar, Type 4 wind turbine generators, or any other inverter-based resource with the ability to inject active power. Second, the output of the controller, such as controller 112, may be used to modulate reactive power/current, which may be particularly useful for flexible ac transmission system (FACTS) devices that lack the capability to modulate active power directly, such as static VAR compensators (SVCs) or static synchronous compensators (STATCOMs). In the latter case the principle of operation is similar to a PSS, in which electrical power/torque is modulated via the voltage.

As should be appreciated, and for simplicity, FIG. 4 neglects the reactive power/current control loop.

Figure 5:
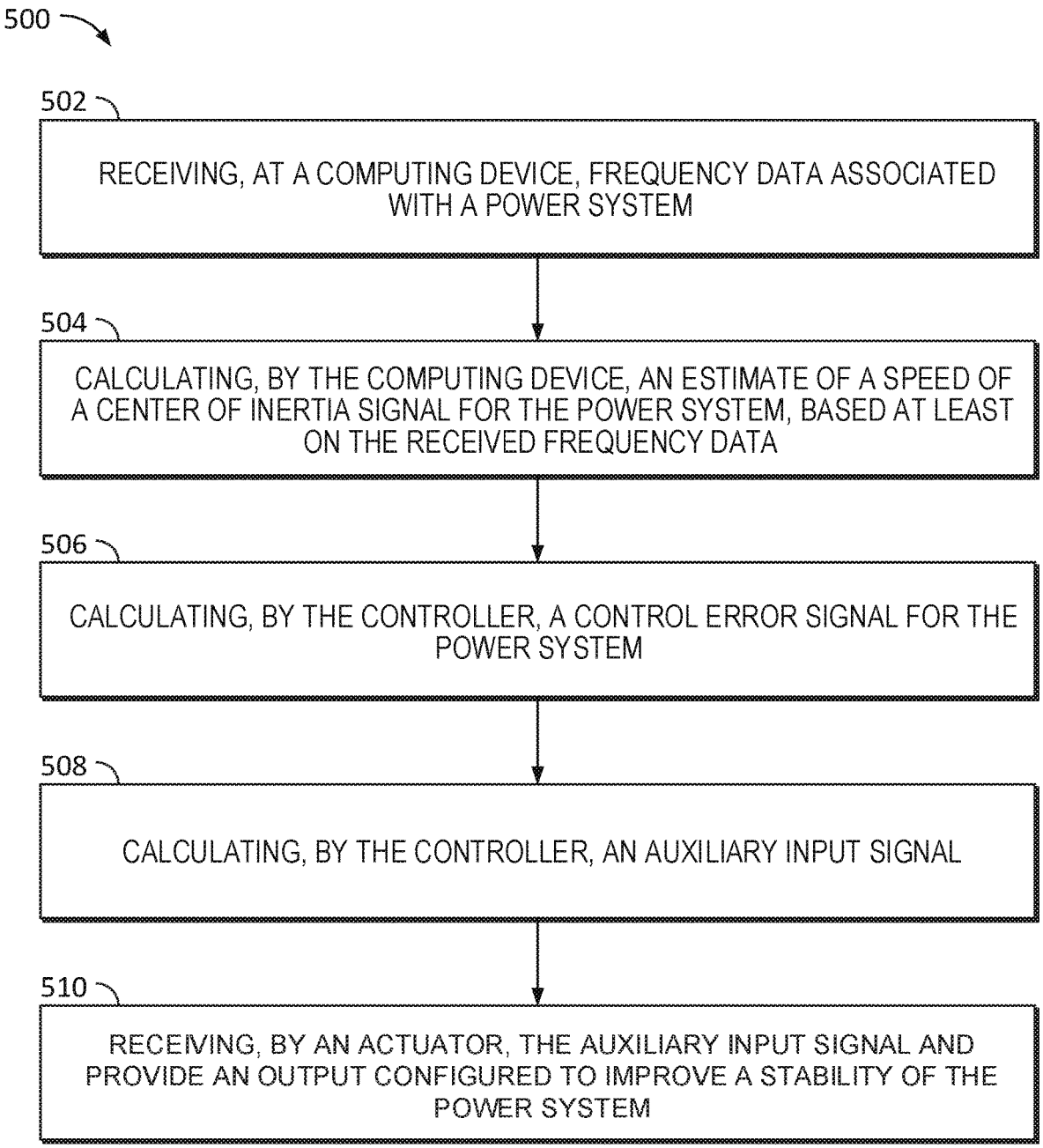
FIG. 5 illustrates a flowchart of a method for determining an auxiliary input signal, in accordance with examples described herein.

FIG. 5 is a flowchart of a method 500 arranged in accordance with examples described herein. The method 500 may be implemented, for example, using system 100 of FIG. 1.

The method 500 includes receiving, at a computing device, frequency data associated with a power system at block 502, calculating, by the computing device, an estimate of a speed of a center of inertia signal for the power system, based at least on the received frequency data at block 504, calculating, by a controller, a control error signal for the power system at block 506, calculating, by the controller, an auxiliary input signal at block 508, and receiving, by an actuator, the auxiliary input signal and provide an output configured to improve the stability of the power system at block 510.

Block 502 recites receiving, at a computing device, frequency data associated with a power system. As described herein, the received frequency data (e.g., frequency measurements, frequency signals, etc.) may be collected from a plurality of sensors (e.g., phasor measurement units) (PMUs) within a power system (e.g., a power grid, etc.). In some examples, each sensor of the plurality of sensors has an associated weight, where the weight is a sensor-specific inertia constant. In some examples, each inertia constant corresponds to the size of the generator with which the sensor is associated. In some examples, the larger the sensor, the larger the associated inertia constant. In some examples, each frequency measurement may include time stamp information from, for example, incoming GPS satellite signals. In some examples, the frequency data may be received in near real-time using, for example, fiber optics (e.g., very low latency).

In some examples, rather than frequency data, bus voltage angle data (e.g., bus voltage angle measurements) may be received from each sensor of the plurality of sensors within the power system. In some examples, the computing device may calculate or determine frequency data for each sensor in the plurality of sensors based on the received bus voltage angle data from each sensor.

Block 504 recites calculating, by the computing device, an estimate of a speed of a center of inertia signal for the power system, based at least on the received frequency data. In some examples, calculating the estimate of the speed of the center of inertia signal is based at least on a weighted average of the received frequency data.

Block 506 recites calculating, by a controller, a control error signal for the power system. In some examples, the controller may calculate the control error signal for the power system based at least on the calculated estimate of the speed of the center of inertia signal for the power system. In some examples, the controller may calculate the control error signal using, for example, equation (7) described herein.

Block 508 recites calculating, by the controller, an auxiliary input signal. In some examples, calculating the auxiliary input signal may be based on applying a washout filter to the control error. In some cases, the washout filter may be a high-pass filter. In some examples, calculating the auxiliary input signal may be further based on utilizing a lead-lag compensator, where the lead-lag compensator phase-adjusts the control error.

Block 510 recites receiving, by an actuator, the auxiliary input signal and provide an output configured to improve the stability of the power system. In some examples, the actuator may improve the stability of the power system based at least on the actuator utilizing the received auxiliary input signal to change a field current of the actuator. In some examples, the power system may comprise synchronous machinery, inverter-based resources, or a combination thereof. Examples of synchronous machinery includes systems that are actually synchronous, nearly synchronous, or generally are capable of converting mechanical power from a prime mover into electrical power at a particular voltage and frequency, and, that have an exciter capable of responding to excitation signals (e.g., auxiliary input signals). Examples of inverter-based resources include photovoltaic solar panels, wind turbines, battery energy storage systems, and the like, having inverters.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

IMPLEMENTED EXAMPLES

Two-Area System Analysis

A combination of time- and frequency-domain analysis may be employed to analyze the control strategy. A dynamic model based on FIG. 1 may be implemented in the MATLAB-based Power System Toolbox (PST). This application may facilitate not only time-domain simulation of nonlinear systems but also linearization and modal analysis. Two test systems have been analyzed: a small model based on the Klein-Rogers-Kundur (KRK) two-area system and a reduced-order model of the Western Interconnection. The two-area test system may comprise 13 buses, 14 branches, and 4 synchronous generators. In both models, the active component of the system load may be modeled as constant current and the reactive component as constant impedance.

To analyze transient disturbances, several modifications may be made to the original KRK system. The synchronous machines in the standard case may be representative of aggregate groups of generators concentrated in each area. Each unit may have the same capacity and the same inertia constant. Hence, tripping any one generation unit offline may be equivalent to losing 25% of the rotating inertia online in the system. The capacity may be redistributed such that each area possessed one machine representative of a collection of generators, and the other a large individual plant. Generators G1 and G3 may be scaled such that they may each represent 5% of the overall system capacity. The remainder may be equally split between G2 and G4. Every unit in the system may then be outfitted with the generalized $\Delta\omega$ PSS described herein.

Sensitivity of System Poles to the PSS Tuning Parameters

The effects of sweeping the PSS tuning parameters $\beta_1$ and $\beta_2$ on the poles of the system are examined. The modal analysis may be performed by linearizing the system dynamics and then solving for the eigenvalues and eigenvectors of the system matrix. The main result may be that the oscillatory modes effectively split into two groups, one that may be sensitive to changes in $\beta_1$ and the other $\beta_2$. The effect of the tuning parameters on the inter-area and local modes are examined. The inter-area mode was located at 0.76 Hz in this example. The mode shape is defined by the elements of the right eigenvector corresponding to the states of interest. This mode is characterized by generators G1 and G2 oscillating against G3 and G4. The two-area system may be tuned such that this inter-area mode may be unstable without supplemental damping control.

The plots in this example show the sensitivity of the system poles to the PSS tuning parameters. Either $\beta_1$ or $\beta_2$ may be swept over an interval while the other may be held at zero. The tuning parameters for all of the PSS units were swept in unison, and the gain was uniformly held fixed at K=25 in this example. Sweeping the tuning parameters for all units together may facilitate understanding of the effect of PSSs on the frequency regulation mode. The $\beta_1$ parameter was swept over the interval [0,1], while $\beta_2$ was held at zero in this example. As $\beta_1$ increases, the inter-area mode moves to the left. The local modes in this example move up and to the left. A well-controlled exciter mode near 1.5 Hz moves up and to the right but remains comfortably in the left half of the complex plane. For all intents and purposes, the frequency regulation mode may be unaffected by changes in $\beta_1$. Hence, $\beta_1$ may dictate the extent to which the PSS damps inter-area and local modes of oscillation.

The parameter $\beta_2$ may primarily influence the frequency regulation mode. This mode was located at 0.09 Hz in this example. The shape of the frequency regulation mode was observed through various machine speeds. All of the machine speeds were in phase and had nearly identical magnitudes. The $\beta_2$ parameter was swept over the interval [0,1], while $\beta_1$ was held at zero. As $\beta_2$ increases, the frequency regulation mode moved to a smaller value on the real axis, while a well-controlled higher-frequency exciter mode righto a higher value on the real axis and a higher value on the imaginary axis. In contrast, the inter-area and local modes were relatively insensitive to changes in $\beta_2$. Accordingly, as the frequency regulation mode may be based on $\beta_2$, PSSs, in aggregate, can play an important role in shaping the system response to transient disturbances. A collection of time-domain simulations was conducted to further demonstrate this phenomenon and the effects of the PSS turning parameters.

Time-Domain Simulations

The two-area system was simulated in PST for a variety of PSS tunings. As in the frequency-domain analysis, all PSS units were tuned alike and used the same gain in these examples. The contingency of interest in this set of simulations may be a trip of generator G3. This event was selected because it initiates a transient disturbance that excites not only the inter-area and local modes but also the frequency regulation mode. In the first set of simulations, $\beta_1$ was varied over the set $\{0.33, 0.67, 1\}$ while $\beta_2$ was held fixed at 0.33. In the second set of simulations, $\beta_1$ was held fixed at 0.33 while $\beta_2$ was varied over the set $\{0, 0.33, 0.67\}$. For all simulations, the overall PSS gain was set to K=18. The case where $\beta_1=\beta_2=0.33$ corresponds to a standard $\Delta\omega$ stabilizer with a gain of K=6. This set of simulations assumes ideal communication in the construction of the time-varying reference $\bar{\omega}(t)$. The effect of nonideal communication network performance is also described herein.

For the case where $\beta_1$ is varied, there is a difference in relative speed (on the order of $10^{-3}$ pu) between generators G2 and G4, i.e., $\omega_2(t)-\omega_4(t)$. The oscillatory content in this signal is dominated by the 0.76 Hz inter-area mode. As $\beta_1$ increases, the damping of this mode also increases. When plotting the terminal voltage of generator G4, as $\beta_1$ is varied, the large-signal trajectory of the terminal voltage and its post-disturbance value are unchanged. This reflects the fact that varying $\beta_1$ only alters the small-signal characteristics of the field current.

For the case where $\beta_2$ is varied, plotting the system frequency response, which readily shows the behavior of the frequency regulation mode, shows that $\beta_2$ may be important in determining the depth of the frequency nadir. In this example, the frequency nadir may improve significantly as $\beta_2$ increases from 0 to 0.33, and modestly as it goes from 0.33 to 0.67. Effectively, $\beta_2$ may determine the level of overshoot in the system step response. When plotting the terminal voltage of generator G4, as $\beta_2$ is increased, the terminal voltage following the generator trip becomes incrementally more depressed. This can be attributed to the fact that $\beta_2$ may control the extent to which steady-state changes in rotor speed are included in the PSS control error.

The mechanism by which $\beta_2$ may affect the frequency nadir is indirect. Increasing $\beta_2$ may amplify the steady-state component of the control error given in equation (7). This may depress the field current supplied by the exciter, and may cause the voltage induced in the stator to dip. Depending on the stiffness of the load, the electrical torques on the shafts of the synchronous machines may then vary more gradually following the disturbance. This may reduce the time-varying mismatch in mechanical and electrical torque, which may improve the frequency nadir. This effect may depend on the load composition. The improvement in the nadir may decrease as the fraction of constant power load increases. Hence, there may be a trade-off between improving the frequency nadir and degrading the voltage response. The tendency of the PSS to counteract the voltage signal sent to the exciter by the AVR can reduce synchronizing torque and degrade transient stability. The control strategy disclosed herein may allow fine tuning of the interaction between the PSS and AVR without affecting the damping of inter-area and local modes, and vice versa.

Large-Scale Test System Analysis

For examples of the two-area system discussed herein, the inter-area and local modes may be influenced by $\beta_1$, and the frequency regulation mode by $\beta_2$. Whether this property is preserved for large-scale systems was also investigated. A reduced-order model of the Western Interconnection named the miniWECC, in reference to the Western Electric Coordinating Council (WECC), is considered. It comprises 122 buses, 171 ac branches, 2 HVDC lines, and 34 synchronous generators. This system spans the entirety of the interconnection including British Columbia and Alberta. Its modal properties have been extensively validated against real system data.

Sensitivity of System Poles to the PSS Tuning Parameters

To examine the sensitivity of the oscillatory modes to the PSS tuning parameters, example methods described herein are applied to the miniWECC. Every generation unit in the system may be outfitted with a generalized $\Delta\omega$ PSS with the gain set to K=25. In practice, WECC policy may suggest that a PSS shall be installed on every synchronous generator that is larger than 30 MVA, or is part of a complex that has an aggregate capacity larger than 75 MVA, and is equipped with a suitable excitation system. In examples, the movement of the system poles can be shown in response to changes in the tuning parameters. In examples, either $\beta_1$ or $\beta_2$ was swept over an interval while the other was held at zero. The main result matches the one observed for the two-area system. The inter-area and local modes may be influenced by $\beta_1$, and the frequency regulation mode by $\beta_2$. For the miniWECC, there is one well-controlled exciter mode near 0.28 Hz that exhibits sensitivity to both parameters.

Open-Loop Frequency Response Analysis

The frequency-domain analysis presented above focuses on a system-wide perspective. A unit-specific analysis of the open-loop frequency response for a single generator is provided herein. Outfitting a single unit with a PSS may yield the state-space representation $$\dot{x}(t) = Ax(t) + B_p u(t) \qquad \text{Equation (14)}$$

$$y_v(t) = C_v x(t), \qquad \text{Equation (15)}$$

where $B_p$ may describe how the system states may be affected by changes in the PSS control input. The closed-loop control action determined by equation (9) can be implemented with the input $$u(t) = -K y_v(t) = -K C_v x(t) \qquad \text{Equation (16)}$$

$$u(t) = -K \begin{bmatrix} 0 & \gamma_1 & \gamma_2 & \cdots & -\beta_1 \end{bmatrix} \begin{bmatrix} \hat{x}(t) \\ f_1(t) \\ f_2(t) \\ \vdots \\ \omega_i(t) \end{bmatrix}, \qquad \text{Equation (17)}$$

The results described herein may be based at least partly on the strategy defined by equations (9)-(11) and illustrated in FIG. 2, where K is a scalar gain. The output matrix $C_v$ combines the states to form the PSS feedback signal v(t). Note the presence of the extra negative sign to conform to the negative feedback convention. The state vector x in equation (17) is organized with the unused states $\hat{x}$ on top, followed by the frequency, measurements and the local rotor speed. For the kth sensor, $\gamma_k = \alpha_k(\beta_1 - \beta_2)/\theta_0$, where $\alpha_k$ stems from the linear combination in equation (2), and $\theta_0$ is the nominal system frequency. In this analysis, the frequencies were computed by applying a derivative-filter cascade to the bus voltage angles. Hence, the unity-gain open-loop transfer function between a change in the PSS reference $v_{ref}$ and the feedback signal v is $$H(s) = C_v(sI - A)^{-1} B_p. \qquad \text{Equation (18)}$$

As shown in some examples where the input to the plant is fed to the exciter, equation (18) is also the open-loop transfer function between a change in the exciter voltage reference $V_{ref}$ and the output of the PSS $v_s$. Using this function, the effect of the PSS tuning parameters on the open-loop frequency response may be evaluated. For this analysis, only the unit being studied may be outfitted with a PSS.

Some examples illustrate the effect of on the open-loop frequency response for generator G2, a hydroelectric unit in eastern British Columbia, where $\beta_2=1$ for all traces. The peak in the amplitude response near 0.04 Hz corresponds to the frequency regulation mode. Examples show that $\beta_1$ has no effect on the gain of the system at this frequency. This corroborates the system-wide modal analysis previously shown at the unit level. As expected, $\beta_1$ does change the amplitude response for the inter-area and local modes of oscillation. Unlike traditional compensation methods, this approach may not degrade the phase response in the attenuation region. As $\beta_1$ is varied, the phase response at the frequencies of the dominant amplitude peaks (0.37 Hz, 0.62 Hz, and 1.0 Hz) is essentially unchanged. The observed transition in phase through 0° at the resonant frequencies is ideal for damping control.

Other examples show the effect of $\beta_2$ on the open-loop frequency response, where $\beta_1=1$ for all traces. As $\beta_2$ is varied, the amplitude response at the frequencies corresponding to the local and inter-area modes is effectively unchanged. In contrast, the gain at the frequency regulation mode is reduced by roughly 14 dB as $\beta_2$ goes from 1 to 0.2. For $\beta_2=0.2$, the phase response at the frequency regulation mode may lead the case where $\beta_2=1$ by roughly 35°. This suggests that if a $\beta_2$ value below some nominal threshold is required for a particular application, it may be necessary to retune the lead-lag compensator and/or washout filter to ensure satisfactory low-frequency performance.

Co-Simulation of Power and Communication Systems

Some of the analysis presented above was performed under the assumption of ideal communication. The effect of communication delay on the system is discussed herein. This behavior may be analyzed in the frequency domain and verified in the time domain. The mathematical modeling developed here generally represents the real-time exchange of synchronized phasor measurement data over a network. Modifying the state-space output matrix in equation (15) to account for delays yields, $$\hat{C}_v(s) = [\,0 \quad \gamma_1 e^{-s\tau_1} \quad \gamma_2 e^{-s\tau_2} \quad \ldots \quad -\beta_1\,] \qquad \text{Equation (19)}$$

$$\hat{H}(s) = \hat{C}_v(s)[sI - A]^{-1} B_p, \qquad \text{Equation (20)}$$

where $\tau_k$ is the delay of the kth sensor. Thus, the output matrix may change as a function of frequency. The open-loop transfer function with delay may be given by equation (20). In some examples, we use equation (20) to evaluate the effect of delay on the open-loop frequency response for generator G2 with $\beta_1=1$ and $\beta_2=0.5$. For simplicity, $\tau_k=\tau$ for all k in this example. Communication delays in PMU networks are typically in the range of 20-50 ms. Pessimistic scenarios with delays that are 10 to 20 times greater than the high end of this range are evaluated herein. In the extreme case where $\tau=1$ s, the gain and phase may be altered slightly in the neighborhood of the frequency regulation mode; however, the control performance and stability margins may be essentially unchanged. The effect of delay on the open-loop frequency response may be dependent on the values of the PSS tuning parameters. Analysis indicates that tunings where $\beta_1 \ll \beta_2$ may be more susceptible to the effects of delay. Careful stability analysis may be done to ensure that it is safe to employ a particular tuning given the performance characteristics of the communication network.

A co-simulation framework called HELICS was used to investigate the impact of communication delay in the time domain. First, a communication network model for the miniWECC was developed in ns-3. It featured end-points corresponding to the PMUs that communicate with the controllers via the User Datagram Protocol (UDP). This model includes transmission delay, congesting traffic, and packet-based error emulation. Each generation unit in the power system model was outfitted with a generalized $\Delta\omega$ PSS where $\beta_1=1.0$, $\beta_2=0.5$, and K=9. FIG. 13 shows time-domain simulations of generator G26, a large nuclear plant in Arizona, being tripped offline for various mean communication delays $\bar{\tau}$. For this example, the time-domain results are in close agreement with the frequency-domain analysis shown when using equation (20). Thus, the benefits of the control strategy may be retained even under pessimistic assumptions of communication network performance.

A Control Strategy Variation Using Accelerating Power Feedback

For generators that are susceptible to torsional oscillations, control strategies that are based on rotor speed feedback or extensions thereof, such as equations (9) and (12), may not be the foremost choice. In such cases, the generalized $\Delta\omega$ PSS framework described herein may be extended to allow feedback based on accelerating power or the integral of accelerating power. One possible method of estimating the appropriate accelerating power signal is in examples where the input denotes the speed-based control error defined in equation (12). The other input to the estimation method is the measured electrical power output of the unit $\Delta P_e$. This technique effectively plays the swing equation block diagram in reverse to estimate the accelerating power $\Delta P_a$. Because the accelerating power may lead the rotor speed by 90 degrees, the integral of the accelerating power may serve as a useful feedback signal for the stabilizer. In comparison to feedback schemes that apply equation (9) or (12) directly, the method shown in other examples may produce additional amplitude response attenuation in the frequency range corresponding to the torsional modes of the machine.

A new PSS architecture that can be viewed as a generalization of the standard $\Delta\omega$-type stabilizer is presented herein. Example control strategies that may incorporate local information with a real-time estimate of the center-of-inertia speed have been described. This approach may allow for the damping of inter-area and local modes to be tuned independently of the stabilizer effect on the frequency regulation mode. Thus, it may provide enhanced control over interactions between the PSS and AVR. A variation of the proposed architecture may also be used that allows integral of accelerating power feedback for mitigating torsional oscillations. Finally, online methods to optimally estimate the center-of-inertia frequency in the presence of delays, jitter, and measurement noise may also be used.

Accordingly, examples of architectures and methodologies for power system stabilizers are described herein.

What is claimed is:

1. A system comprising:
a computing device configured to receive frequency data from a plurality of sensors within a power system;
the computing device further configured to calculate an estimate of a speed of a center of inertia signal for the power system, based at least on the received frequency data;
a controller configured to calculate a control error signal for the power system based at least on a difference between a rotor speed and the estimate of the speed of the center of inertia signal;
the controller further configured to calculate an auxiliary input signal based at least on the control error signal; and
an actuator configured to receive the auxiliary input signal and provide an output configured to improve a stability of the power system.

2. The system of claim 1, wherein calculating the estimate of the speed of the center of inertia signal for the power system is further based at least on a weighted average, wherein each sensor of the plurality of sensors within the power system has a corresponding weight.

3. The system of claim 2, wherein each corresponding weight for each sensor of the plurality of sensors within the power system is an inertia constant, wherein each inertia constant is specific to each corresponding sensor.

4. The system of claim 1, wherein calculating the auxiliary input signal is further based at least on applying a washout filter to the control error signal.

5. The system of claim 4, wherein the washout filter is a highpass filter.

6. The system of claim 4, wherein calculating the auxiliary input signal is further based at least on utilizing a lead-lag compensator, wherein the lead-lag compensator phase-adjusts the control error signal.

7. The system of claim 1, wherein improving the stability of the power system is based at least on the actuator utilizing the received auxiliary input signal to change a field current of the actuator.

8. The system of claim 1, wherein the power system comprises synchronous machinery.

9. The system of claim 8, wherein the controller is configured to calculate the control error signal further based on a speed of the synchronous machinery.

10. The system of claim 1, wherein the power system includes inverter-based resources.

11. A method comprising:
receiving, at a computing device, frequency data associated with a power system;
calculating, by the computing device, an estimate of a speed of a center of inertia signal for the power system, based at least on the received frequency data;
calculating, by a controller, a control error signal for the power system based at least on a difference between a rotor speed and the estimate of the speed of the center of inertia signal;
calculating, by the controller, an auxiliary input signal based at least on the control error signal; and
receiving, by an actuator, the auxiliary input signal and provide an output configured to improve a stability of the power system.

12. The method of claim 11, wherein the frequency data is associated with a plurality of sensors within the power system, and wherein calculating, by the computing device, the estimate of the speed of the center of inertia signal for the power system is further based at least on a weighted average, wherein each sensor of the plurality of sensors in the power system has a corresponding weight.

13. The method of claim 12, wherein each corresponding weight for each sensor of the plurality of sensors is an inertia constant, wherein each inertia constant is specific to each corresponding sensor.

14. The method of claim 11, wherein calculating, by the controller, the auxiliary input signal is further based at least on a combination of applying a washout filter to the control error and utilizing a lead-lag compensator, wherein the lead-lag compensator phase-adjusts the control error.

15. The method of claim 14, wherein the washout filter is a highpass filter.

16. The method of claim 11, wherein the power system comprises at least one of a synchronous machine, inverter-based resource, or a combination thereof.

17. The method of claim 16, wherein said calculating the control error signal is further based on a speed of the synchronous machinery.

18. A non-transitory computer readable medium having executable computer-executable instructions stored thereon that, if executed by one or more processors of a computer device, cause the computing device to perform one or more steps comprising:
receiving frequency data from a plurality of sensors within a power system;
calculating an estimate of a speed of a center of inertia signal for the power system, based at least on the received frequency data;
calculating a control error signal for the power system based at least on a difference between a rotor speed and the estimate of the speed of the center of inertia signal;
calculating an auxiliary input signal based at least on the control error signal; and
receiving the auxiliary input signal and providing an output configured to improve a stability of the power system.

19. The computer readable media of claim 18, wherein calculating the estimate of the speed of the center of inertia signal for the power system is further based at least on a weighted average, wherein each sensor of the plurality of sensors within the power system has a corresponding weight.

20. The computer readable media of claim 18, wherein calculating the auxiliary input signal is further based at least on a combination of applying a washout filter to the control error and utilizing a lead-lag compensator, wherein the lead-lag compensator phase-adjusts the control error.

* * * * *